United States Patent
Banerjee et al.

(10) Patent No.: US 8,447,766 B2
(45) Date of Patent: May 21, 2013

(54) METHOD AND SYSTEM FOR SEARCHING UNSTRUCTURED TEXTUAL DATA FOR QUANTITATIVE ANSWERS TO QUERIES

(75) Inventors: Somnath Banerjee, Karnataka (IN); Soumen Chakrabarti, Maharashtra (IN); Ganesh Ramakrishnan, Maharashtra (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 235 days.

(21) Appl. No.: 12/766,942

(22) Filed: Apr. 26, 2010

(65) Prior Publication Data
US 2011/0264670 A1   Oct. 27, 2011

(51) Int. Cl.
*G06F 17/30* (2006.01)
*G06F 7/00* (2006.01)

(52) U.S. Cl.
USPC .......................................... 707/748; 707/769

(58) Field of Classification Search
None
See application file for complete search history.

(56) References Cited

U.S. PATENT DOCUMENTS

| | | | |
|---|---|---|---|
| 6,234,484 B1* | 5/2001 | Strauss | 273/292 |
| 6,947,920 B2* | 9/2005 | Alpha | 1/1 |
| 2002/0073115 A1* | 6/2002 | Davis | 707/500.1 |
| 2008/0243777 A1* | 10/2008 | Stewart et al. | 707/3 |

OTHER PUBLICATIONS

"Learning to Rank for Quantity Consensus Queries", Somnath Banerjee et al. ACM Jul. 2009.*
Wu, M. and Marian, A., "Corroborating Answers from Multiple Web Sources", WebDB 2007.

* cited by examiner

*Primary Examiner* — Charles Kim
*Assistant Examiner* — Miranda Huang

(57) ABSTRACT

Disclosed is a method of querying a collection of electronic documents, comprising defining a query for retrieving a numerical answer, said query comprising one or more search terms and a tolerance for said numerical answer; defining a set of document portions from said collection, each document portion in said set being extracted from an electronic document and comprising at least one term relevant to at least one of the one or more search terms and a numerical value associated with the at least one term; ordering the associated numerical values contained in said set; defining a plurality of results groups, each results group comprising an interval of ordered numerical values, each interval having a range not exceeding the tolerance; ranking the results groups; and returning at least the interval of the highest ranked results group as a response to said query A computer program product for executing this method on a computer processor and a server are also disclosed.

15 Claims, 5 Drawing Sheets

Figure 1:
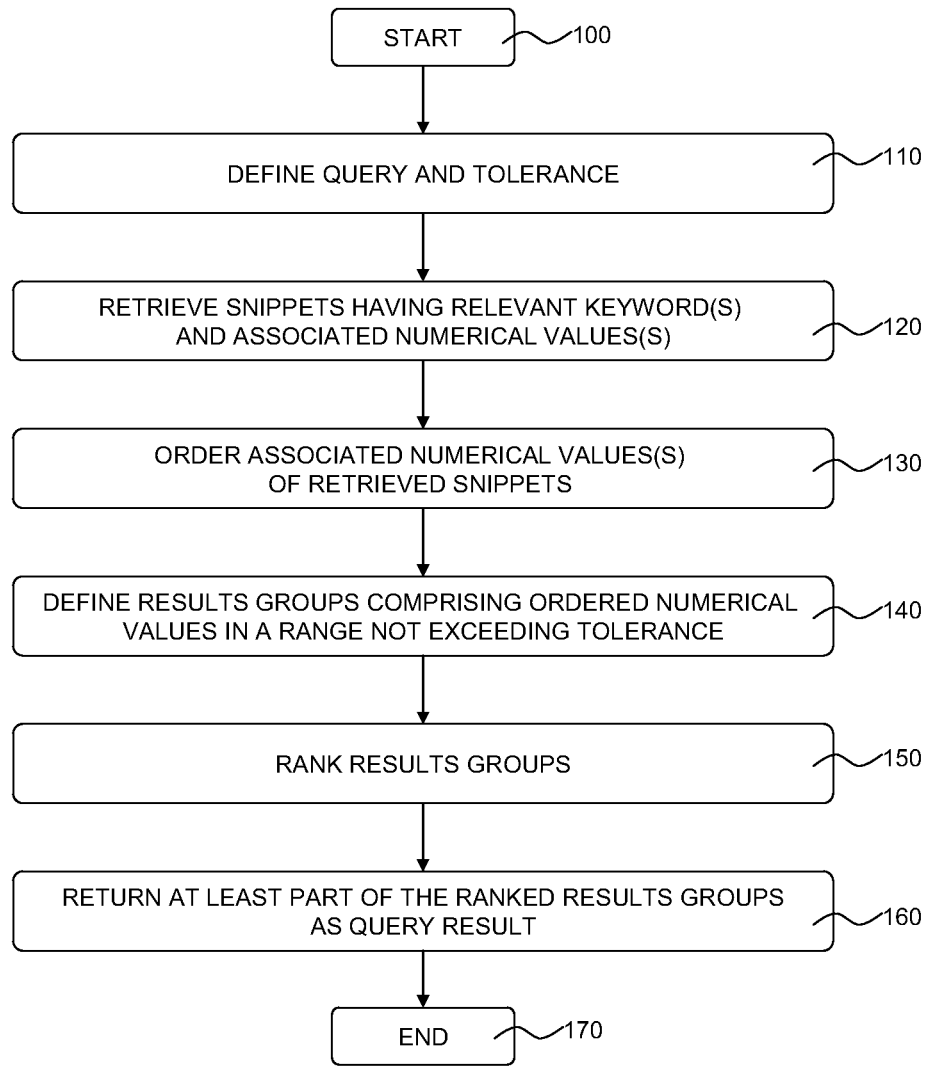

METHOD AND SYSTEM FOR SEARCHING UNSTRUCTURED TEXTUAL DATA FOR QUANTITATIVE ANSWERS TO QUERIES

BACKGROUND OF THE INVENTION

Electronic information retrieval is at the heart of modern society. Almost every household in the developed countries has some device to access electronic databases, such as a personal digital assistant, mobile phone or computer that can be connected to the Internet. A direct result of this connectivity is that electronic database information retrieval, and in particular Internet information retrieval has become a multi-billion dollar industry, not in the least because it is far from trivial to find the desired information in the sheer volumes of available data. This has led to the development of highly sophisticated search algorithms in which for instance advanced parsing techniques are used to quickly retrieve data from database records, e.g. websites, which have a recognized structure.

A specific class of data base queries is a query in which an answer to a question is sought. An example of such a query is "What is the capital of Australia?" Such queries may be for instance be answered using the well-known weighted majority vote technique in which the most common term associated with the search terms of the queries in the collected documents is presented as the answer (Canberra). Such queries typically utilize a redundancy property of the correct answer to a question-based query typically appearing many times on the Internet, contrary to incorrect answers, which will be much rarer.

In case a numerical answer such as a product price is sought, the search algorithm may run a search query on a subset of the Internet, in which product definitions and retail prices are available in recognizable fields of a categorized webpage, wherein the search algorithm parser utilizes the fact that the data of interest resides in such fields, such that a range of prices may be presented to the user. For instance, the Google shopping search engine allows users to define a query using search terms to describe a product and a price interval of interest.

However, it will be apparent that not all queries can utilize such formatting, for instance because the information of interest typically does not reside in categorized form. Also, some queries in which a numerical answer is sought cannot utilize weighted majority voting techniques because these techniques tend to fail, especially when the correct answer cannot be expressed as a single value, in which case the aforementioned redundancy occurs to a much lesser extent or does not occur at all.

An example of such a query is for instance "What is the lifetime of the Canon NB-5L battery in a Powershot SD1100 camera?" Such information may reside in on-line user forums and review websites, in which the sought answer is typically present in unformatted form, i.e. not available in a dedicated field, and may be present as an interval rather than a single value; "when used with flash I found the Canon NB-5L battery to last 2-3 hours in my Powershot SD1100".

Also, for certain queries, it may be unclear what the correct answer is, e.g. "What is the age of the universe?" As there are many different ways of trying the estimate this age, a wide range of different answers may be obtained, from which it may be difficult to extract the correct answer due to the lack of redundancy in the answer set. In addition, it may be that keywords in a document that match the search terms of the query are associated with a numerical value that is unrelated to the question subject. More generally speaking, the current search methods do satisfactorily handle a query aiming to return a numerical value that is likely to contain a certain degree of uncertainty.

BRIEF DESCRIPTION OF THE EMBODIMENTS

Embodiments of the invention are described in more detail and by way of non-limiting examples with reference to the accompanying drawings, wherein:

FIGS. 1-5 show flowcharts of various example embodiments of aspects of the method of the present invention.

DETAILED DESCRIPTION OF THE DRAWINGS

It should be understood that the Figures are merely schematic and are not drawn to scale. It should also be understood that the same reference numerals are used throughout the Figures to indicate the same or similar parts.

In accordance with an aspect of the present invention, a method of querying a collection of electronic documents such as the Internet is provided, in which the query is designed to return results groups characterized by numerical intervals that either are or contain the potential answer to the query, wherein each group is ranked to predict the reliability of its numerical interval, i.e. the estimated relevance of the numerical interval. In other words, this query method is designed to present a user seeking a numerical answer to a question with a number of numerical intervals that are ranked in terms of predicted accuracy.

Preferably, this method seeks to extract relevant portions of largely unstructured electronic documents such as largely text-only web pages that contain numerical values that are potentially relevant to the user-defined query.

In an embodiment, such a method may comprise defining a query for retrieving a numerical answer, said query comprising one or more search terms and a tolerance for said numerical answer; defining a set of document portions from said collection, each document portion in said set being extracted from one of said electronic documents and comprising at least one term relevant to at least one of the one or more search terms and a numerical value associated with the at least one term; ordering the associated numerical values contained in said set; defining a plurality of results groups, each results group comprising an interval of ordered numerical values, each interval having a range not exceeding the tolerance; ranking the results groups; and returning at least the interval of the highest ranked results group as a response to said query.

In short, the method relies on first identifying a number of candidate documents, e.g. web pages that comprise one or more terms that are relevant to, e.g. match, at least some of the keywords in the defined query and grouping the numerical values of the candidate documents into intervals, i.e. results groups, for which respective relevance scores are calculated. This has the advantage that numerical answer intervals having an improved accuracy compared to prior art techniques can be achieved without requiring increased computational effort, as will be explained in more detail below.

Each result group may comprise the document portions, i.e. snippets, from which the numerical values comprised by the interval are obtained, and/or respective links to the document(s). Each snippet typically contains the numerical value and the at least one term relevant to at least one of the query keywords. In an alternative embodiment, the document portion is the whole document, although for the remainder of the application, the present invention will be explained in more detail using snippets of documents by way of non-limiting example only.

In the context of the present application, a numerical value belonging to such a snippet will be referred to as an associated numerical value. Such a snippet may have any suitable size, i.e. may comprise any suitable number of terms. A numerical value may be considered to be associated with a relevant search term belonging to a snippet if the distance between the numerical value and the search term matches a predefined criterion. Such a criterion may for instance dictate that the numerical value should reside in the same sentence or paragraph of the snippet as the matched search term(s) or may dictate that the numerical value should be within a given distance in words from the matched search term(s). Other suitable criteria will be apparent to the skilled person.

In the context of the present application, it is not necessary for a search term to be explicitly present in an electronic document to be relevant to it. It will be apparent to the skilled person that such relevance may also be determined by using query expansion or latent semantic indexing to retrieve snippets that do not explicitly contain the search terms.

The query method according to several embodiments of the present invention in essence comprises a horizontal quantity, i.e. an open domain search, which has the advantage that reliable numerical answers may be retrieved where traditional ranking methods such as weighted majority voting cannot provide a satisfactory query result. The present invention is based on the realization that the aforementioned redundancy will occur in appropriately defined intervals because the appropriate numerical answer to the query will typically lie in a certain range. The user typically will have some intuition or knowledge of how wide an interval should be to capture the promising candidate answers, such that the specification of the tolerance in the query, which is a measure of the error margin allowed by the user in the candidate answers, aids to group the most promising candidate answers into a single results group, as will be explained in further detail below.

A non-limiting example of such a query method is depicted in the flowchart of FIG. 1. The method starts in step 100, after which a user of a terminal having access to a collection of electronic documents such as a computer connected to the Internet, may specify a query in step 110 by one or more keywords, i.e. search terms, the answer to which is some numerical value. Typically, the queries addressed by the query method depicted in FIG. 1 are queries for which no single correct numerical answer exists and for which the numerical answers are typically not available from structured records, e.g. structured websites, but must be retrieved from e.g. a textual context in a snippet from an unstructured (web-based) document. Some non-limiting examples of such queries include "What is the travel time from Paris to Nice by car?"; "How old is the universe?"; "What is the price of a Canon Powershot S51S camera?" and so on.

In step 110, the user further specifies a tolerance with the search terms, which defines the error in the numerical answer that the user is willing to tolerate. Such a tolerance may be expressed in absolute terms e.g. a specific amount or in relative terms, e.g. a percentage. In an embodiment, the user may also define a unit for the numerical answer sought, e.g. hours or minutes for a query expecting an answer relating to time, grams or kilos for a query expecting an answer relating to mass and so on.

In step 120, the collection of electronic documents is searched for candidate documents, i.e. electronic documents that comprise terms relevant to at least one of the defined terms, i.e. keywords, in the query defined in step 110. Any suitable search algorithm may be used. A snippet is taken from a candidate document if it contains the relevant term(s) and an associated numerical value.

In an embodiment, the user defining the query in step 110 may have included a unit or type for the numerical value of interest, in which case a snippet is only taken if the numerical value in the snippet is compatible with the numerical value of interest. A numerical value is compatible if it refers to the same physical quantity (such as distance), although it may be a different type of unit (such as meters vs. yards). For instance, compatible units may be S.I. units and non-S.I. units for the same physical quantity, such as meters and yards for distance.

Also, in an embodiment, the method may be adapted to recognize different spellings of the same unit, e.g. ft., foot and feet, or m., metre, meter and so on. In case of an associated numerical value relating to the same physical quantity but having a different unit than the unit specified by the user, a conversion factor may be used to convert the associated numerical value (say 100 meter) into a transformed numerical value (0.1 km) having the desired unit prior to further processing the associated numerical value, as will be explained in more detail later.

The extracted snippets together form a set of document portions, i.e. snippets, from which search results groups may be defined. Prior to defining such search results groups, the associated numerical values of the snippets are ordered in step 130. This may be achieved in any suitable way. For instance, the set of snippets may be converted into a list of snippets ordered by ascending or descending associated numerical values.

From such an ordered list, a number of search results groups may be defined in step 140 to group the snippets and their associated numerical values into intervals that have a range that does not exceed the tolerance width specified by the user in step 110. Several embodiments of such a grouping step will be explained in more detail with the aid of FIG. 2. Once these results groups have been defined, each results group is ranked, i.e. assigned a relevance score based on the snippets contained in each interval, as shown in step 150. Several embodiments of such a ranking step will be explained in more detail with the aid of FIG. 3-5.

Finally, the results of the query are returned to the user in step 160, after which the method terminates in step 170. The results may be returned to the user in any suitable form. For instance, a user may be presented with a list of the highest ranked intervals to give the user an impression of the numerical answers to his query that are most likely to be accurate. Alternatively, the user may be presented with only the highest ranked interval, or with all generated intervals sorted in a descending relevance order. The ranking intervals may comprise a hyperlink to provide the user access to a list of the document or snippets retrieved from the document from which the relevance of the interval has been calculated. Other suitable ways of presenting the query results to the user will be apparent to the skilled person.

At this point it is noted that in step 120, a snippet may be retrieved that comprises more than one associated numerical value. For instance, a query that looks to find the average driving time from Paris to Nice may find a website on the Internet stating: "I drove from Paris to Nice in just under 6 hours last week. However, in the holiday season, the journey from Paris to Nice can take as much as 10 hours!" In such a case, the same snippet may be added more than once to the set of snippets, i.e. once for each associated numerical value.

In an alternative embodiment, the average of the associated numerical values may be determined, after which the snippet is added to the set based on its average associated numerical value. The latter embodiment is particularly advantageous if there is evidence in the snippet that the different associated numerical values are related, e.g. define a range; for instance, a website stating that "the average drive time from Paris to Nice is 6-10 hours" comprises syntax, i.e. the hyphen indicating a range, such that an average may be taken to find the middle of the range. It will be readily understood by the skilled person that routinely available parsing techniques may be applied to identify such ranges. Alternatively, the document or snippet may be assigned to the set more than once using the extreme numerical values of the range, i.e. once for each of the values 6 and 10 in the above example. Other variations will be apparent to the skilled person.

Figure 2:
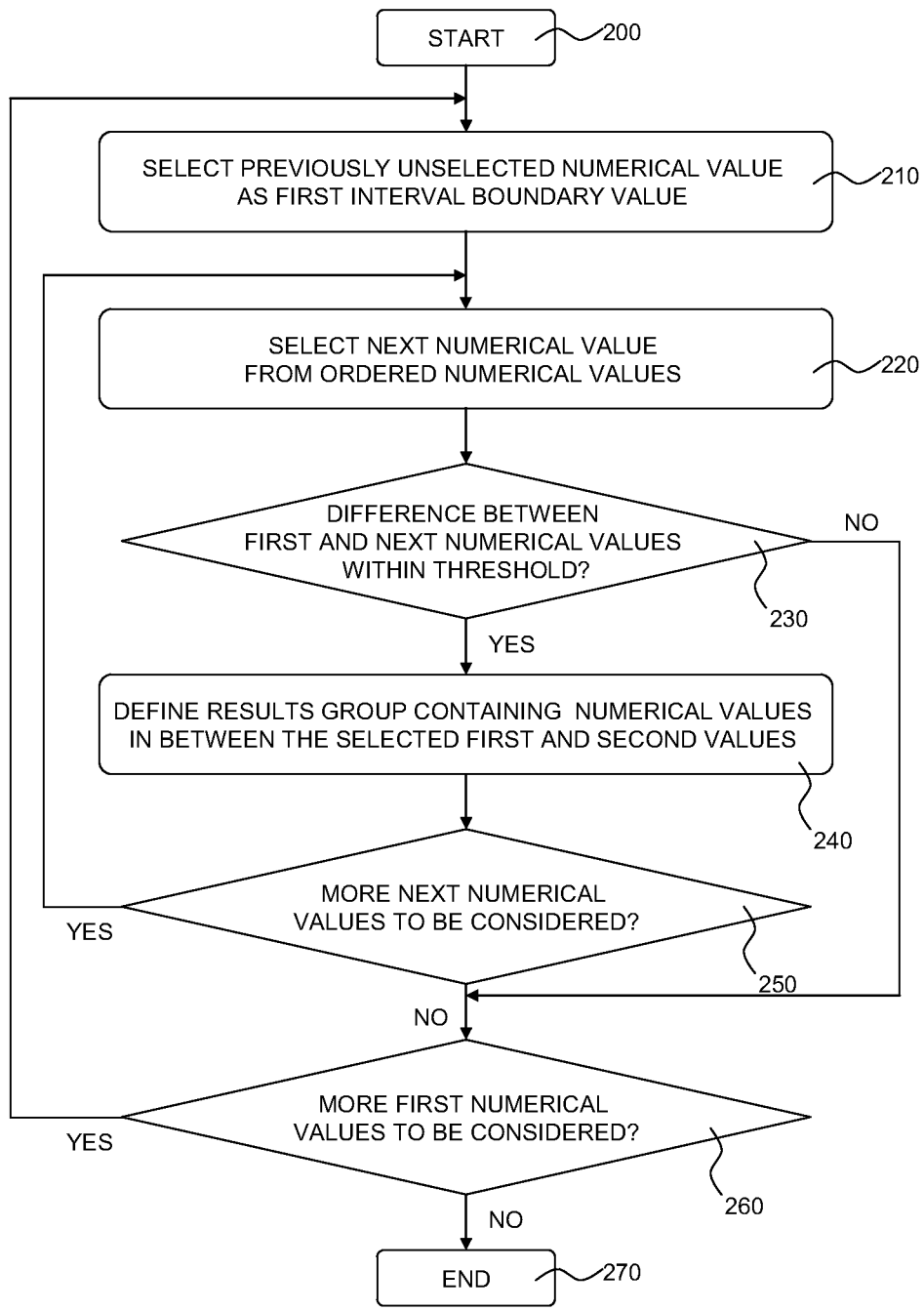

Some aspects of the present invention will now be explained in further detail. FIG. 2 depicts an embodiment of step 140 of the method depicted in FIG. 1, which will be explained with the aid of the following example ordered list L of associated numerical values that have been returned from a query defined in step 110 with a tolerance width of 6:

L={1,3,6,10,20,22,23,25}

In accordance with the embodiment shown in FIG. 2, the results group determining method starts in step 200 and proceeds with selecting the first available numerical value in the ordered list, which is '1' in the present example. This first numerical value is a candidate value for defining the first interval boundary of a results group. In next step 220, the next numerical value in the ordered list is selected, which is '3' in the present example.

It is checked in step 230 if the difference between the first selected numerical value and the subsequently selected numerical value does not exceed the user-defined threshold width. In the present example, this width is defined as '6' whereas the difference (distance) between the first selected numerical value and the subsequently selected numerical value is 3−1=2. Hence, in the present example, it has been found that the two selected numerical value can define a valid interval, such that a group results interval [1, 3] is defined in step 240. This interval contains exactly two snippets, i.e. the snippets associated with numerical values 1 and 3.

However, if the difference between the between the first selected numerical value and the subsequently selected numerical value would have exceeded the threshold width as checked in step 230, no valid interval can be defined as all other subsequent numbers in the ordered list have a larger distance to the first selected numerical value, such that the method may proceed to step 260 in which it is checked if there are further associated numbers to be considered as the initial value of a results group interval, which, if this is the case, causes the method to revert back to step 210 where the next previously unselected numerical value is selected. For the sake of clarity, it is emphasized that in the context of step 210, 'previously unselected' refers to previously unselected in this step, i.e. does not take into account the selection of numerical values in step 220. If it is decided in step 260 that there are no further first numerical values to be considered, the method terminates in step 270.

After a results group interval has been defined in step 240, the method proceeds to step 250 in which it is checked if there are more candidate subsequent numerical values to define further results groups intervals using the first interval boundary value selected in step 210. In an embodiment, this may be implemented by simply checking if the subsequently selected numerical value in step 220 is the last associated numerical value in the ordered list generated in step 130. If further candidate numerical values exist, the method reverts back to step 220. If not, the method proceeds to the previously discussed step 260.

It will be appreciated that, upon termination of the method in step 270, the following intervals will have been generated: [1, 3]; [1, 6]; [3, 6]; [6, 10]; [20, 22]; [20, 23]; [20, 25]; [22, 23]; [22, 25] and [23, 25], with each interval containing all snippets having associated numerical values falling in the given range. For instance, the results group interval [20, 25] contains four snippets, i.e. the snippets associated with numerical values 20, 22, 23 and 25. It should however be understood that the above example is a simplified example; typically such intervals will contain many more snippets, especially when the intervals contain relevant associated numerical values, as previously explained.

It will be appreciated that alternative embodiments for defining the results groups are equally feasible. For instance, the defined intervals may be characterized by one or both end points being excluded from the interval. Also, in an alternative embodiment, after the execution of step 210, the interval may be defined by the first interval boundary value, with the opposite interval boundary value being defined by the sum of the first interval boundary value and the user-defined tolerance, which in the above example would yield a results group with an interval of [1, 7] after which all snippets having values in this range may be placed in this results group. Subsequently, the next available first boundary value, e.g. 10 in the above example, may be used to define a second interval, i.e. [10, 16] in the above example with all intermediate snippets being placed in this interval. This is repeated until all snippets have been assigned to an interval.

This has the advantage that non-overlapping intervals are defined, e.g. intervals [1, 7]; [10, 16]; [20, 26] in the above example, such that every retrieved snippet is assigned to a results group, contrary to the embodiment of FIG. 2 in which some snippets may be discarded if no second snippet can be found to successfully define an interval having a range not exceeding the user-defined tolerance width. However, it is pointed out that this alternative embodiment may not be as accurate as the embodiment shown in FIG. 2, especially when the user-defined tolerance is inaccurate.

Figure 3:
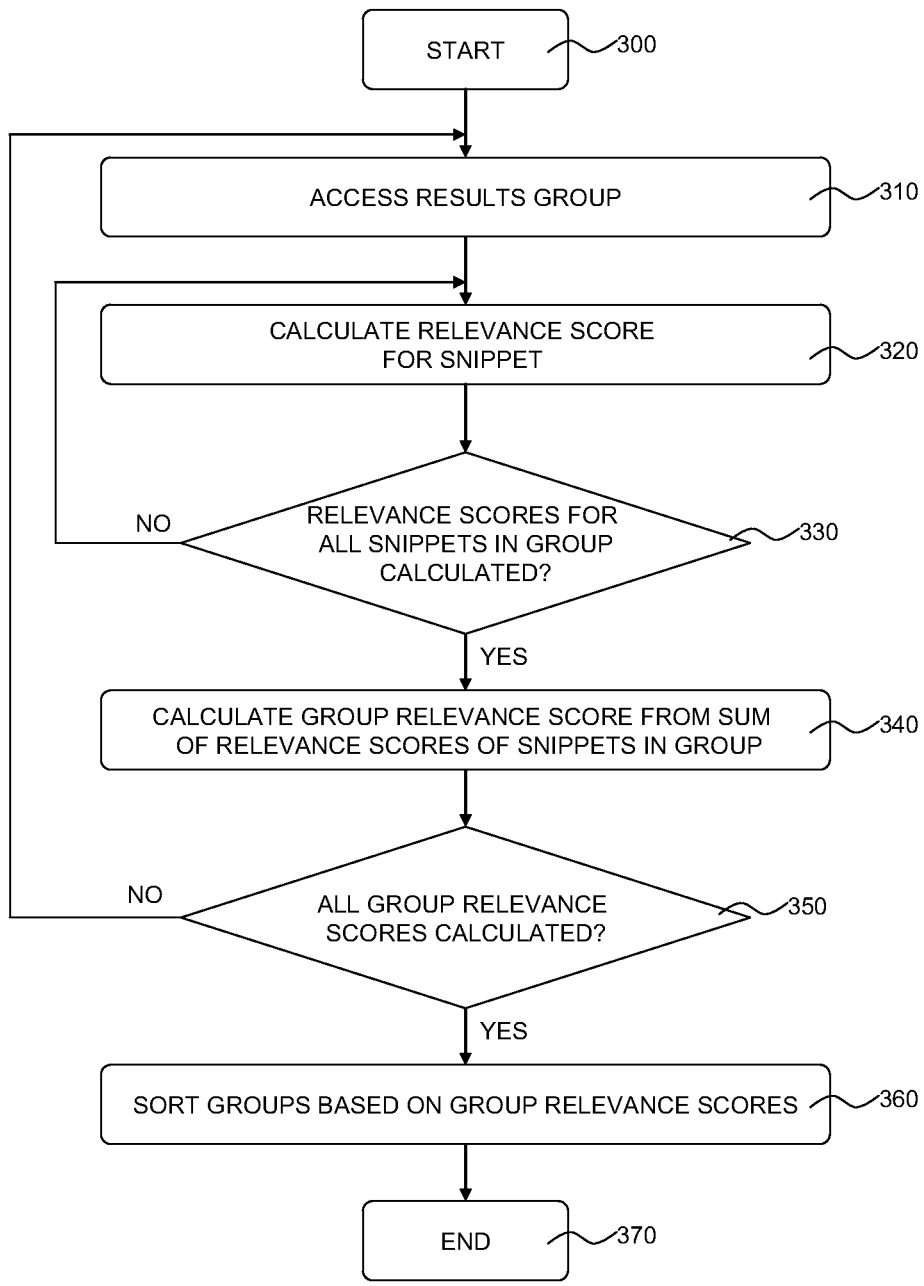

After the results groups have been defined in terms of such intervals, a relevance score is calculated for each interval. In other words, each results group is assigned a ranking score as shown in step 150 of the embodiment of FIG. 1. At this point, a number of non-limiting example implementations of the ranking step 170 will be explained in more detail. A flowchart of a first embodiment is shown in FIG. 3, in which the relevance score of an interval is assigned on the basis of Formula (I):

$$G_j = \sum_{i=1}^{N} r_i \quad (I)$$

in which $G_j$ is the group relevance score of the $j^{th}$ interval or results group comprising N snippets, with $r_i$ being the relevance score derived for the $i^{th}$ snippet. In words, the relevance score of a results group is calculated as the sum of the relevance scores of the snippets inside the results group. As shown in FIG. 3, such a score may be calculated by starting the calculation in step 300, after which the ranking method proceeds to step 310 in which the results group is accessed and a snippet therein is selected. In step 320, the relevance score for the selected snippet is calculated. Such a relevance score indicates how appropriate the snippet is for the given query. This may be calculated in any suitable manner, for instance by using language analysis algorithms, which are known per se and will not be discussed in further detail for reasons of brevity only.

In an embodiment, such a relevance score is based on the number of matched query search terms the snippet comprises, the distance between the associated numeric value and the nearest term considered to be relevant to the search query defined in step 110, the rarity of the relevant terms in the corpus of the snippet (inverse document frequency), the quality of the document from which the snippet is retrieved and so on.

In step 330, it is checked if the relevance scores for all snippets have been calculated. If not, the method returns to step 320, otherwise the method proceeds to step 340 in which the group relevance score is calculated in accordance with Formula (I) above. In an alternative embodiment, the group relevance score may be calculated as per Formula (II):

$$G_j = \frac{\sum_{i=1}^{N} r_i}{N} \quad \text{(II)}$$

In words, the group relevance score is the average snippet relevance score in this alternative embodiment. Other variations will be apparent to the skilled person.

In step 350, it is checked if all results group relevance scores have been calculated. If not, the method reverts back to step 310 to calculate the group relevance score for the next results group. Otherwise, the method proceeds to step 360 in which the group relevance scores are ranked in any suitable manner, e.g. by sorting the characteristic intervals in descending order of relevance.

Figure 4:
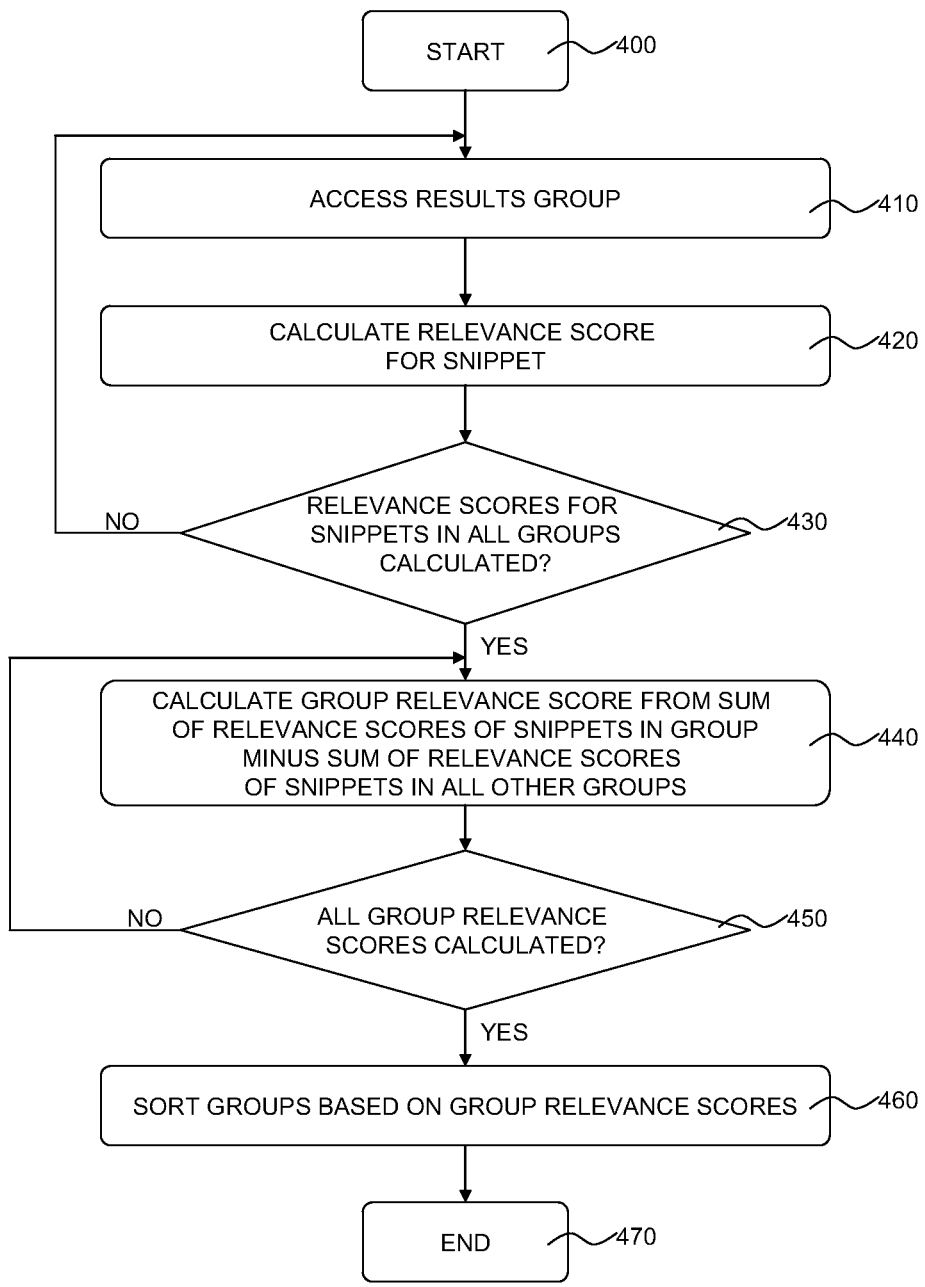

A flowchart of an alternative embodiment of ranking step 170 is depicted in FIG. 4, in which a ranking method starts in step 400 and proceeds to step 410 in which a results group is accessed and the relevance scores of all snippets in the accessed results group are calculated in step 420, for instance as previously described. This procedure is repeated for all results groups, as indicated by check step 430, after which the group relevance scores for the respective results groups are calculated in step 440, for instance in accordance with Formula (III):

$$G_i = \sum_{i \in I} \sum_{j \notin I} (w^T z_i - w^T z_j) \quad \text{(III)}$$

In words, a results group I has a ranking $G_i$ defined by the difference between the sum of the ranking scores $w^T z_i$ of the snippets in group I and the sum of the ranking scores $w^T z_j$ of the snippets in all other results groups. It is noted that in this formula, favorable and unfavorable score pairs can cancel each other out. This may be avoided by redefining formula (III) as follows:

$$G_i = \sum_{i \in I} \sum_{j \notin I} \max(0, w^T z_i - w^T z_j) \quad \text{(IV)}$$

This is known as hinging. It is noted that in machine learning, hinge loss is typically minimized as opposed to the maximization of hinge gain in formula (IV). It has however be found that the application of hinge loss minimization tends to yield inaccurate relevance scores for the intervals defined in step 140.

The ranking method subsequently proceeds to step 450 in which it is checked if all results group relevance scores have been calculated. If this is not the case, the method reverts back to step 440; otherwise, the method proceeds to step 460 in which the intervals of the results groups are ranked in accordance with their respective group relevance scores, as previously discussed, after which the method terminates in step 470. It has been found that the ranking method depicted in FIG. 4 achieves query results, i.e. numerical answers, with an improved accuracy compared to the ranking method depicted in FIG. 3. This is because results groups that do not contain at least one highly relevant snippet will be penalized accordingly, especially when the relevance scoring algorithms of Formula (III) or (IV) are applied.

Figure 5:
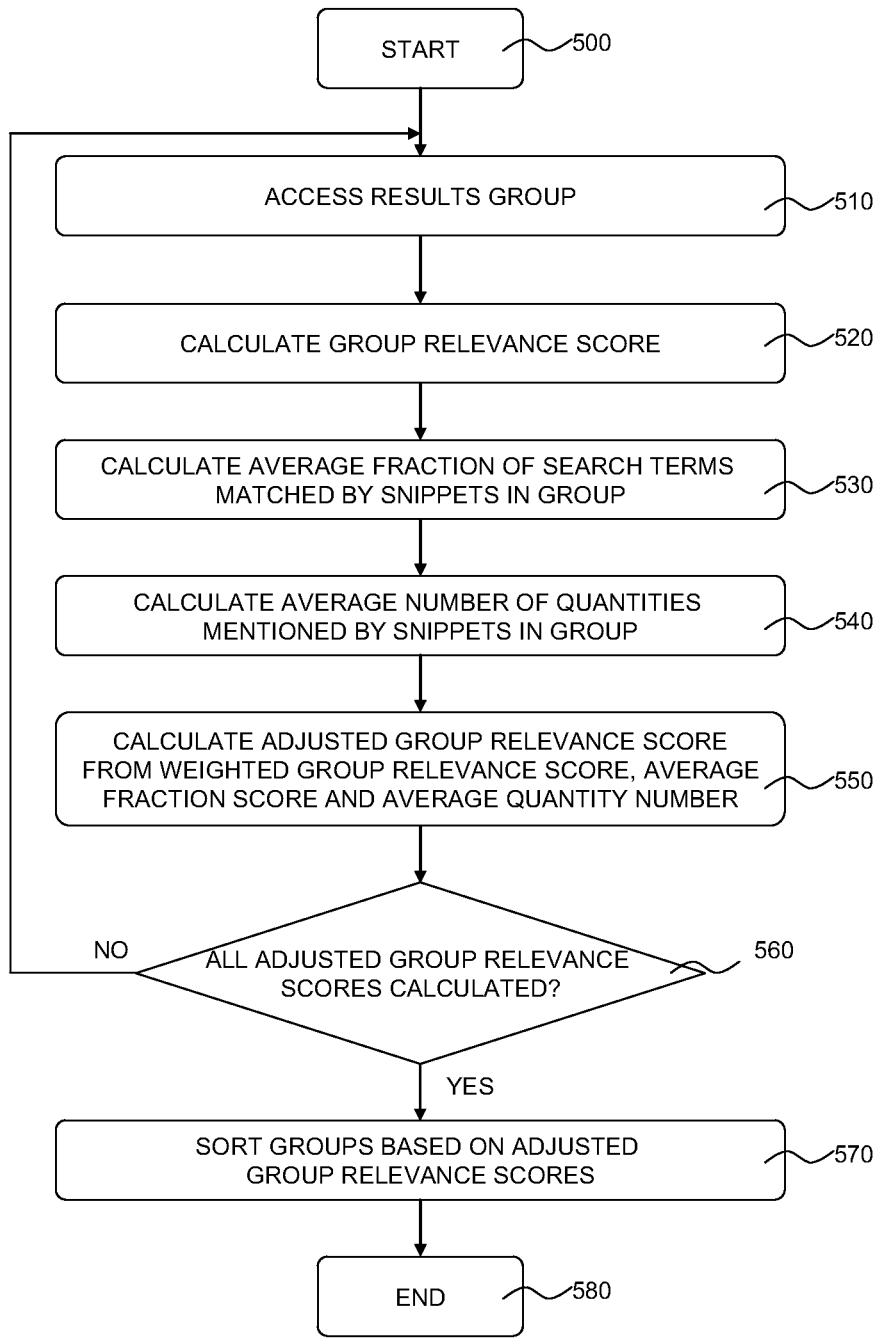

Another non-limiting example embodiment of the ranking step 170 is given in FIG. 5, which starts in step 500 and proceeds to access one of the results groups in step 510. In this embodiment, machine learning techniques are applied to rank the intervals from interval features. In the context of the present application, an interval feature defines the quality of the interval. Intuitively, an interval is of good quality if it contains many high scoring snippets, the snippets in the interval contain many query keywords, the snippets in the interval agree on certain quantities and so on. These properties may be used to define the features of the interval. Non-limiting examples of suitable interval features include the previously discussed interval relevance scores, which may be calculated in step 520, the fraction of query keywords that the snippets in the interval contain on average, which may be calculated in step 530 and the number distinct quantities in the snippets in the interval, which may be calculated in step 540.

Once the intervals are represented using features, the intervals can be scored using a linear or non-linear combination of the feature values. The weight or importance of a feature can be learned using a machine learning technique and some training data. In an embodiment, training data is used for some example intervals containing snippets that have been assigned a ground truth relevance score, as shown in Table I. The training data is obtained through a manual labeling process of the snippets for the example queries shown in Table I.

In Table I, the quantity of each snippet is either underlined or not to label whether the numerical value in the snippet is an appropriate candidate answer to the query. Inappropriate candidate answers may be numerical values having an incompatible unit, numerical values having a correct unit but that are incorrectly associated with the relevant terms in the snippet and so on.

Once the snippet labels have been determined, the relevance score of an interval can be computed as the fraction of good snippets in the interval, i.e. the fraction of snippets having a ground truth relevance score of 1. Such example intervals with ground truth relevance scores can be used as the training data for a machine learning algorithm to learn the weights of the features. This feature weights are then used to compute the relevance score for the intervals at query time for new queries in step 550 of the method in FIG. 5.

TABLE I

| Query | Snippets | Quantity |
|---|---|---|
| Price of Canon PowerShot | The Canon PowerShot S700 IS camera will be available in April for an estimated selling price of $399.99. | $399.99 |

TABLE I-continued

| Query | Snippets | Quantity |
|---|---|---|
| S700 IS | Battery for Canon NB-5L Powershot SD700 SD850 SD950 IS Current Bid: $5.58 | $5.58 |
| | The new 6 Megapixel Canon PowerShot SD700 IS digital camera will be available in May for an estimated selling price of $499.99 | $499.99 |
| | Top 10 Digital Cameras Under $500 from Yahoo! Shopping, Canon PowerShot SD1100 IS Digital ELPH, Canon's Digital ELPHs have always looked good | $500 |
| | List Price: $29.99. 2 Replacement Canon NB-5L Batteries and Mini Battery Charger for Canon PowerShot SD700 IS, SD800 IS, SD850 IS & SD900 | $29.99 |
| Per capita income of Mumbai | Mumbai's per-capita income is Rs. 48,954 (US$ 1,119.19) which is almost three times the national average. | US$ 1,119.19 |
| | Mumbai's per capita income may be higher than the rest of the country of India, but we're still dealing with a country where the per capita hovers around $1000 | $1000 |
| | Mumbai, November 6. Finance minister P Chidambaram has said he expects the country's per capita income to touch $4,000 by 2025," shattering all forecasts by global economic pundits | $4,000 |
| | Mumbai's per-capita income is between 1000-1300$ | 1000-1300$ |

The method shown in FIG. 5 may repeat the machine learning based ranking of the results groups for all results groups generated in the query, as indicated by check step 560 after which the groups are ranked, e.g. sorted, in step 570 as previously explained. The ranking method of FIG. 5 terminates in step 580.

At this point, it is noted that for instance in the context of the embodiment of FIG. 2, a further results group may be generated that completely encloses a first results group. In other words, the interval of the first results group may completely lie within the interval of the interval of the further results group. In such a case, if the relevance score (ranking) of the smaller interval is lower than the relevance score (ranking) of the larger interval, the smaller results group interval may be pruned, i.e. deleted, from the results list.

Embodiments of the present invention may be implemented on a client-server network, such as a computer connected to the Internet. For instance, when considering the embodiment depicted in FIG. 1, a user may define the query in step 110 on his or her computer, after which the computer sends the query to an appropriate server. The server may be adapted to implement the following steps of the method of FIG. 1:

receive the user-defined query for retrieving a numerical answer, said query comprising one or more search terms and a tolerance for said numerical answer;

define the set of document portions from the collection of electronic documents (e.g. web pages), each document portion in said set being extracted from an electronic document and comprising at least one term relevant to at least one of the one or more search terms and a numerical value associated with the at least one term;

order the associated numerical values contained in said set;

define a plurality of results groups, each results group comprising an interval of ordered numerical values, each interval having a range not exceeding the tolerance;

rank the results groups; and return (160) at least the interval of the highest ranked results group as a response to said query, i.e. provide the computer with the results.

Hence, the server typically implements steps 120-160 of the method depicted in FIG. 1.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of querying a collection of electronic documents, comprising:
   defining a query for retrieving a numerical answer, said query comprising one or more search terms and a tolerance for said numerical answer;
   defining a set of document portions from said collection, each document portion in said set being extracted from an electronic document and comprising at least one term relevant to at least one of the one or more search terms and a numerical value associated with the at least one term;
   arranging the associated numerical values contained in said set in an order;
   defining a plurality of results groups, each results group comprising an interval of the arranged numerical values, wherein each interval is determined based on a difference between two of the arranged numerical values in the set, and wherein each interval has a range not exceeding the tolerance;
   ranking the plurality of results groups; and
   returning at least one interval of a highest ranked results group as a response to said query.

2. The method of claim 1, wherein:
   each results group comprises the document portions corresponding to the numerical values enclosed by its interval; and
   the step of ranking the results groups comprises, for each results group, calculating a ranking score from the document portions comprised in the results group.

3. The method of claim 1, wherein the step of defining the plurality of results groups comprises repeating the steps of:
   selecting a previously unselected first numerical value from the arranged numerical values; and
   defining all results groups intervals ranging from the selected first numerical value to a subsequent numerical value in the arranged numerical values for which the interval range does not exceed the tolerance;
   until all but the last numerical value of the arranged numerical values have been selected as the first numerical value.

4. The method of claim 3, further comprising deleting a results group if its interval is enclosed by the interval of a results group having a higher ranking score.

5. The method of claim 1, wherein the step of defining the plurality of results groups comprises repeating the steps of:
   selecting a numerical value from the arranged numerical values;

defining a results group having an interval ranging from the selected numerical value to a further value defined by the sum of the selected numerical value and the tolerance; and placing all arranged numerical values falling within said interval in said results group;

until all arranged numerical values have been assigned to a results group.

6. The method of claim 1, wherein each document portion further comprises a link to said document.

7. The method of claim 1, wherein the query further comprises an answer type definition, and wherein the step of defining the set of documents comprises adding a document to said set if the numerical value associated with the at least one search term is of a type that is compatible with the answer type definition.

8. The method of claim 2, wherein ranking the plurality of results comprises, for each group:

calculating a relevance score for each document portion placed in said group; and defining a group relevance score by summing the relevance scores of the respective document portions in said group;

said ranking further comprising sorting the group relevance scores.

9. The method of claim 8, wherein the step of defining the group relevance score further comprises:

further summing the relevance scores of the document portions in all other groups; and deducting said further sum from the sum of the relevance scores of the respective document portions in said group.

10. The method of claim 2, wherein ranking the plurality of results comprises, for each group:

calculating a quality indicator for the group from a number of group parameters including a sum of relevance scores of the document portions in the group, the number of the one or more search terms per document portions in said group and the average number of associated numerical values per document portion in said group.

11. The method of claim 10, wherein calculating the quality indicator comprises dynamically weighting each of said parameters based on training data.

12. The method of claim 1, wherein the electronic database is the Internet.

13. A non-transitory computer-readable medium comprising computer program code for, if executed on a computer, causing the computer to:

define a query for retrieving a numerical answer, the query comprising one or more search terms and a tolerance for the numerical answer;

define a set of document portions from a collection of electronic documents, wherein each document portion in the set is extracted from one of the electronic documents and comprises at least one term relevant to at least one of the one or more search terms and a numerical value associated with the at least one term;

arrange the associated numerical values contained in the set in an order;

define a plurality of results groups, each results group comprising an interval of the arranged numerical values, wherein each interval is determined based on a difference between two of the arranged numerical values in the set, and wherein each interval has a range not exceeding the tolerance;

rank the plurality of results groups; and return at least one interval of a highest ranked results group as a response to the query.

14. A non-transitory computer-readable medium of claim 13, wherein the computer program code causing the computer to define the plurality of results groups comprises computer program code causing the computer to repeatedly:

select a previously unselected first numerical value from the arranged numerical values; and define all results groups intervals ranging from the selected first numerical value to a subsequent numerical value in the arranged numerical values for which the interval range does not exceed the tolerance;

until all but the last numerical value of the arranged numerical values have been selected as the first numerical value.

15. An internet server, adapted to:

receive a query for retrieving a numerical answer, said query comprising one or more search terms and a tolerance for said numerical answer;

define a set of document portions from a collection of electronic documents, each document portion in said set being extracted from one of the electronic documents and comprising at least one term relevant to at least one of the one or more search terms and a numerical value associated with the at least one term;

arrange the associated numerical values contained in said set in an order;

define a plurality of results groups, each results group comprising an interval of the arranged numerical values, wherein each interval is determined based on a difference between two of the arranged numerical values in the set, and wherein each interval has a range not exceeding the tolerance;

rank the plurality of results groups; and return at least one interval of a highest ranked results group as a response to said query.

* * * * *